United States Patent
Vennin

[15] 3,707,295
[45] Dec. 26, 1972

[54] MANDREL FOR MACHINE TOOL
[72] Inventor: Gerard G. Vennin, Chaville, France
[73] Assignee: CRI-DAN, Paris, France
[22] Filed: Oct. 8, 1970
[21] Appl. No.: 79,049

[30] Foreign Application Priority Data
Dec. 15, 1969 France..................................6943284

[52] U.S. Cl..........................279/119, 279/1 J, 279/4
[51] Int. Cl. ..............................................B23b 31/16
[58] Field of Search............279/1 J, 120, 119, 4, 1 L, 279/66

[56] References Cited
UNITED STATES PATENTS
3,560,009  9/1968  Renoux................................279/120
2,729,459  1/1956  Leifer..................................279/119

Primary Examiner—Gil Weidenfeld
Attorney—Woodhams, Blanchard and Flynn

[57] ABSTRACT

A mandrel for a machine tool comprising a body having a plurality of locking jaws radially floatably mounted therein. The mandrel includes a mechanism for compensating for eccentricity of a workpiece retained by the mandrel, which mechanism includes a floating ring mounted on a sleeve, both of which are adapted to slide longitudinally relative to the body. The ring is provided with a plurality of inclined ramps, each of which cooperate with a respective lever to operate the locking jaws during longitudinal movement of the ring. The mandrel also includes a balancing device to compensate for the eccentric weight of the ring when same is eccentrically positioned relative to the mandrel axis.

7 Claims, 3 Drawing Figures

PATENTED DEC 26 1972

INVENTOR
GÉRARD G. VENNIN
BY
Woodhams, Blanchard and Flynn
ATTORNEYS

MANDREL FOR MACHINE TOOL

The invention relates to mandrels for machine tools.

Mandrels are often used for machining long workpieces, for example pipes, and thus a spindle of a machine tool on which the mandrel is mounted must be on the axis of the workpiece. These mandrels have a compensating mechanism including a floating ring but even so it is possible to lock the workpiece in a position which is not concentric with the axis of rotation of the spindle. Furthermore, the mass of the ring is comparatively large, especially where workpieces are of large diameter. Consequently, the floating ring itself will be rotated eccentrically by the spindle, and this will exert a stress on the workpiece which reduces the efficiency of the compensating mechanism.

Although the present invention is primarily directed to any novel integer or step, or combination of integers or steps, as herein disclosed and/or shown in the accompanying drawings, nevertheless, according to one particular aspect of the present invention, to which, however, the invention is in no way restricted, there is provided a mandrel for a machine tool comprising a body within which is radially slidably mounted a plurality of locking jaws; a mechanism for compensating for eccentricity in a workpiece retained by the mandrel, the mechanism comprising a floating ring mounted on a sleeve both of which are adapted to slide longitudinally relative to the said body, the ring being provided with a plurality of inclined ramps each of which co-operate with a respective lever to operate the locking jaws during longitudinal movement of the ring; and a balancing device for counterbalancing the eccentric weight of the ring when same is eccentrically positioned relative to the mandrel axis due to an eccentric workpiece.

Preferably, the balancing device consists of a further floating ring disposed in said body and connected to the first-mentioned ring by a plurality of levers each of which is pivotally connected to the said sleeve.

The invention also relates to a machine tool provided with a mandrel as recited above.

The invention is illustrated, merely by way of example, in the accompanying drawings, in which.

Figure 1:
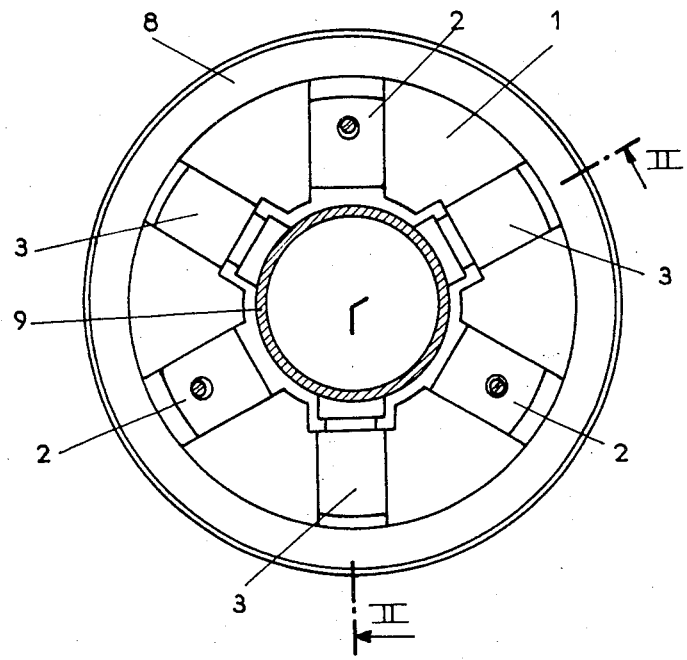
FIG. 1 is a simplified end view of a mandrel for a machine tool according to the present invention.
Figure 2:
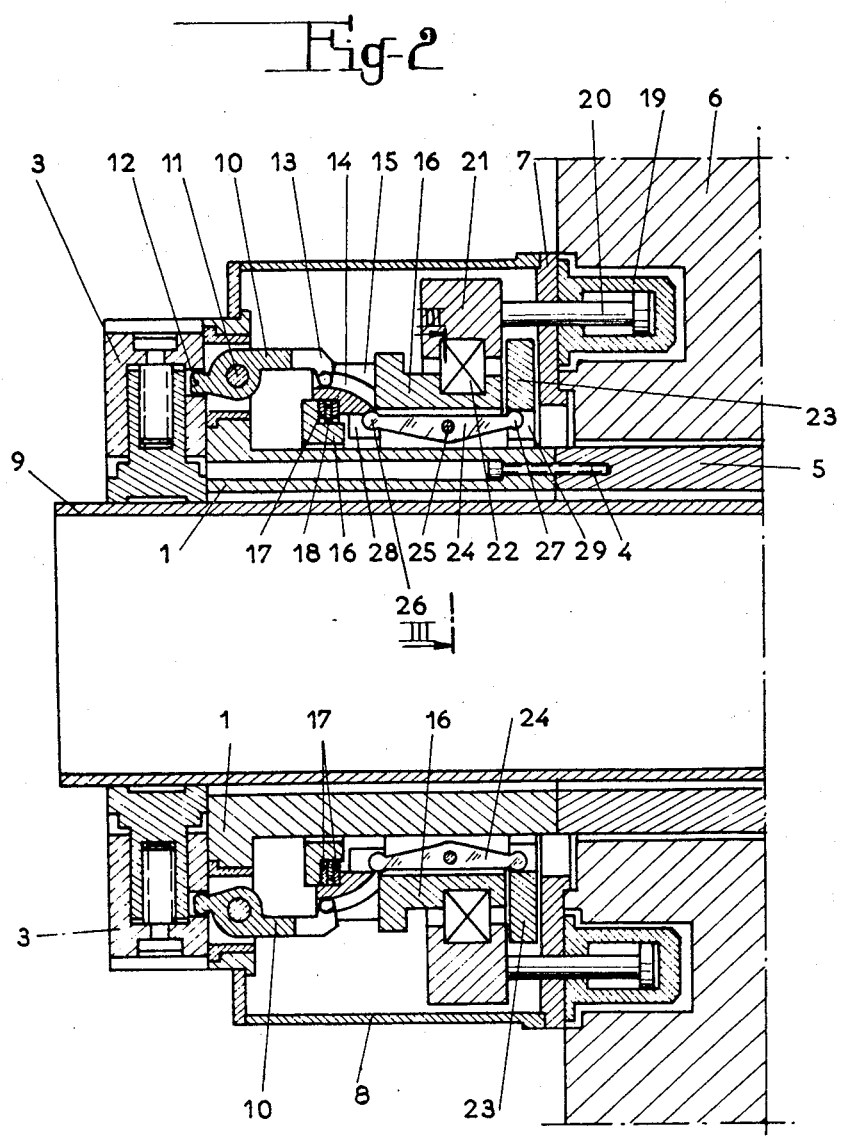
FIG. 2 is a cross-sectional view along the line II — II of FIG. 1, but on a larger scale.

A mandrel shown in FIGS. 1 and 2 consists substantially of a cylindrical body 1, within which three centering jaws 2 and three locking jaws 3 are radially slidably mounted. The centering jaws and locking jaws are alternately spaced apart by 60°.

Figure 3:
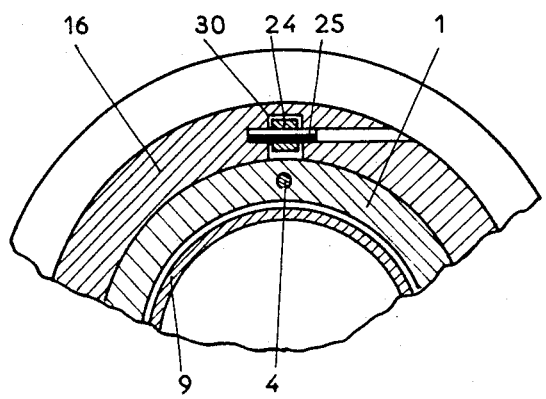
FIG. 3 is a partial cross-section along the line III — III of FIG. 2.

As shown in FIGS. 2 and 3 the body 1 of the mandrel is mounted by means of screws 4 on a rotating spindle 5 of a lathe-type machine tool. The fixed part of the mandrel, that is to say the non-rotating part, is mounted on a headstock 6 of the machine tool by means of an annular plate 7 fixed to the headstock. The annular plate 7 carries a protecting hood 8 of the mandrel. A workpiece to be machined on the machine tool must pass through and be coaxial with the spindle 5. In the drawings the workpiece is shown, merely by example, as a tube 9.

The centering jaws 2 are operated by any convenient known mechanism which ensures the equal displacement of the three centering jaws relative to the axis of the mandrel, so that the tube 9 may be locked concentrically with the axis of rotation of the spindle 5. This mechanism, which is not shown in the drawing, may be, for example, of the type described in U.S. Pat. No. 3,560,009.

The locking jaws 3 are operated by a compensating mechanism which is also of known construction, and which ensures that they may be opened or closed at will, whilst, within certain limits, compensating for eccentricity or geometrical defects in the surface of the tube 9. This compensating mechanism is shown in detail in FIG. 2, and comprises a plurality of levers 10, hinged about pivots 11 mounted on the body 1 of the mandrel. Each lever 10 operates one of the locking jaws 3 by one of its ends 12 which is in the form of a swivel joint co-operating with a corresponding cavity provided in the locking jaw. The other end of each lever 10 has a journal 13 which collaborates with a respective inclined ramp 14 provided on a floating ring 15. The ring 15 is mounted with a certain amount of radial play on an axially slidable sleeve 16.

Washers 17 and 18 are mounted between the ring 15 and the sleeve 16. The washers 17 are centered without clearance in the ring 15, but have a certain clearance relative to the sleeve 16, whilst the washer 18 is centered without clearance on the sleeve 16 and has a certain clearance relative to the ring 15. The number of these washers 17 and 18 is dictated by the desired magnitude of the locking force provided by the locking jaws 3.

The sleeve 16 slides axially on the body 1 of the mandrel but is rotated by the mandrel by means of one or several keyways (not shown). Axial movement of the sleeve 16 is achieved by a plurality of jacks 19, preferably hydraulically operated. The jacks are mounted on the annular plate 7. A piston rod 20 of each jack 19 is mounted on a ring 21 which is connected to the sleeve 16 by way of a ball bearing 22 or any other suitable bearing element. It follows from the foregoing that according to whether pressure fluid is exerted on one or other face of the piston rods 20 of the jacks 19, the sleeve 16 is moved axially in one direction or the other causing either opening or closing of the locking jaws 3, the locking of the tube 9 being such that any eccentricity of geometrical defect in the tube 9 is compensated due to the radial floating of the ring 15 relative to the sleeve 16 as permitted by the washers 17 and 18.

The operation of such a compensating mechanism will not be described in greater detail here, but is described in detail in the above mentioned U.S. Pat. No. 3,560,009.

According to the present invention, the compensating mechanism described above is associated with a balancing device which has the object of compensating for eccentricity in the weight of the floating ring 15 relative to the mandrel axis. This balancing device consists substantially of a second radially floating ring 23 disposed between the annular plate 7 and the sleeve 16.

The second ring 23 is connected to the ring 15 by a plurality of levers 24, of which this embodiment has three and which are pivotally mounted at their centers above pivots 25 located on the sleeve 16. The opposite ends 26 and 27 of each of the levers 24 are rounded off and rest, respectively in recesses 28 and 29, provided in the two rings 15, 23 respectively.

As may be seen clearly from FIG. 3, each lever 24 is located inside the sleeve 16 within a longitudinal groove 30, across which passes the pivot 25 in the form of a headless screw.

The levers 24 ensure symmetrical displacements of the rings 15, 23 relative to the axis of the spindle 5 of the machine tool in radially opposite directions. The eccentric weight of ring 15 is therefore at least partially counter-balanced by the counteracting eccentric weight of the ring 23 so that ring 15 cannot exert any stress on the tube 9 to be locked on the mandrel. In consequence, the tube 9 is fixed relative to the mandrel in the exact position of the centering jaws 2 so that there is substantially no risk of distortion of the axis of the tube.

What is claimed is:

1. A mandrel for a machine tool, comprising a body within which is radially slidably mounted a plurality of locking jaws; a mechanism for compensating for eccentricity in a workpiece retained by the mandrel, the mechanism comprising a ring radially floatable mounted on a sleeve both of which are mounted to slide longitudinally relative to the said body, and ring being provided with a plurality of inclined ramps each of which co-operate with a respective lever to operate the locking jaws during longitudinal movement of the ring; and a balancing device for compensating for the weight of the ring when same is eccentrically positioned, said balancing device including a further radially floatable ring disposed on said body and connected to the first-mentioned ring by a plurality of levers each of which is pivotally connected to said sleeve, whereby said levers cause said rings to move in radially opposite directions.

2. In combination, a machine tool chuck including:
   an annular chuck body adapted to be mounted on a machine tool;
   clamping means for tightly holding a workpiece relative to said chuck body, said clamping means including a plurality of clamping jaws movably mounted on said chuck body for movement radially thereof;
   actuating means connected to said clamping jaws for causing radial displacement thereof relative to the central axis of said chuck body into tight clamping engagement with said workpiece, said actuating means permitting said clamping jaws to be displaced nonconcentrically relative to said axis of said chuck body to compensate for eccentricity of the workpiece relative to the chuck body; and
   said actuating means including an actuated member slidably mounted relative to said body and an actuating element radially floatably mounted relative to said actuating member, and means coacting between said actuating element and said jaws for causing movement thereof in response to slidable movement of said actuating member;
   the improvement comprising balancing means coacting with said actuating element for substantially counterbalancing the weight of said actuating element when same is eccentrically positioned relative to said chuck body.

3. A chuck according to claim 2, wherein said actuating element comprises a ring-like member radially floatably mounted on said actuating member but restrained from moving axially relative thereto, and said balancing means coacting between said ring-like member and said actuating member for compensating for eccentricity in the weight of said ring-like member.

4. A chuck according to claim 3, wherein said balancing means includes a further annular member mounted for radial floating movement relative to said actuating member and lever means pivotally mounted on said actuating member and coacting between said further annular member and said ring-like member for causing movement of said further annular member and said ring-like member in opposite radial directions.

5. A chuck according to claim 4, wherein said ring-like member and said further annular member are axially spaced from one another, and wherein said lever means includes a plurality of levers extending axially between said ring-like member and said further annular member with the opposite free ends of said levers being disposed in engagement with said members, said levers having the intermediate portion thereof pivotally connected to said actuating member.

6. A chuck according to claim 4; wherein said ring-like member is provided with suitable cam means thereon, and said coacting means including lever means pivotally mounted on said body and coacting between said ring-like member and said jaws for causing radial movement of said jaws in response to axial movement of said actuating member.

7. A chuck construction according to claim 6, further including a plurality of centering jaws mounted on said chuck body for movement substantially radially thereof for permitting the workpiece to be substantially centered relative to said body.

* * * * *